(12) United States Patent
MacQueen et al.

(10) Patent No.: US 12,444,009 B2
(45) Date of Patent: Oct. 14, 2025

(54) SYSTEMS AND METHODS FOR GENERATING AND TRAINING A MODULE SELECTION ENGINE FOR DISTRIBUTION ALLOCATION IN A NETWORK ENVIRONMENT

(71) Applicant: BANK OF AMERICA CORPORATION, Charlotte, NC (US)

(72) Inventors: Karen Lea MacQueen, Lyndhurst, OH (US); Melissa Christine Derville Hart, Cornelius, NC (US); Katherine Kei-Zen Dintenfass, Lincoln, RI (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 275 days.

(21) Appl. No.: 17/902,361

(22) Filed: Sep. 2, 2022

(65) Prior Publication Data
US 2024/0078624 A1 Mar. 7, 2024

(51) Int. Cl.
*G06Q 50/20* (2012.01)
*G06Q 10/0639* (2023.01)

(52) U.S. Cl.
CPC ..... *G06Q 50/205* (2013.01); *G06Q 10/06398* (2013.01)

(58) Field of Classification Search
None
See application file for complete search history.

(56) References Cited

U.S. PATENT DOCUMENTS

| | | | | |
|---|---|---|---|---|
| 5,398,300 A | * | 3/1995 | Levey | G06N 3/042 706/46 |
| 5,557,518 A | * | 9/1996 | Rosen | G06Q 20/204 705/76 |
| 7,346,575 B1 | * | 3/2008 | Ahles | G06Q 40/03 705/37 |

(Continued)

FOREIGN PATENT DOCUMENTS

| | | |
|---|---|---|
| CN | 101976419 A | 2/2011 |
| CN | 103049851 A | 4/2013 |

(Continued)

*Primary Examiner* — Jamie H Austin
(74) *Attorney, Agent, or Firm* — Moore & Van Allen PLLC; Lauren M. Stokes

(57) ABSTRACT

Systems, computer program products, and methods are described herein for generating and training a module selection engine for distribution allocation in a network environment. The present invention is configured to receive a subordinate user account identifier associated with a subordinate user account; determine a supervisor user account identifier associated with the subordinate user account identifier; apply a module selection engine to the subordinate user account identifier, wherein the module selection engine determines a plurality of modules to present to the subordinate user based on the subordinate user account identifier; generate, by the module selection engine, a plurality of module interface components; transmit the plurality of module interface components to a user device associated with the subordinate user account; and determine a plurality of module completion statuses for each module of the plurality of module interface components.

20 Claims, 9 Drawing Sheets

(56) References Cited

U.S. PATENT DOCUMENTS

| | | | | |
|---|---|---|---|---|
| 7,537,153 B2* | 5/2009 | Hurwitz | G06Q 20/203 | 705/28 |
| 7,657,497 B2* | 2/2010 | Nandy | G06Q 20/4016 | 706/45 |
| 10,346,003 B2* | 7/2019 | Selfridge | G06F 3/0484 | |
| 11,294,784 B1* | 4/2022 | Bergman | G06N 20/00 | |
| 11,562,357 B2* | 1/2023 | Thomas | G06Q 20/405 | |
| 2003/0140021 A1* | 7/2003 | Ryan | G09B 7/02 | 706/16 |
| 2003/0177087 A1* | 9/2003 | Lawrence | G06Q 20/403 | 705/38 |
| 2003/0233319 A1* | 12/2003 | Lawrence | G06Q 20/10 | 705/39 |
| 2005/0033587 A1* | 2/2005 | Ireland | G07D 11/225 | 705/330 |
| 2005/0080717 A1* | 4/2005 | Belyi | G06Q 40/03 | 705/38 |
| 2006/0146839 A1* | 7/2006 | Hurwitz | G06Q 20/06 | 370/401 |
| 2007/0250441 A1* | 10/2007 | Paulsen | G06Q 40/123 | 705/39 |
| 2011/0302003 A1* | 12/2011 | Shirish | G06Q 10/0639 | 705/7.38 |
| 2013/0151431 A1* | 6/2013 | Linton | G06Q 50/205 | 705/328 |
| 2014/0018974 A1* | 1/2014 | Okita | G06F 7/00 | 701/1 |
| 2017/0295256 A1* | 10/2017 | Moriarty | G06F 16/337 | |
| 2018/0089578 A1* | 3/2018 | Yadav | G06Q 50/01 | |
| 2019/0130512 A1* | 5/2019 | Kuhn | H04L 67/00 | |
| 2020/0372016 A1* | 11/2020 | Rogynskyy | H04L 67/1095 | |
| 2021/0374888 A1* | 12/2021 | Holmes | G06Q 50/205 | |
| 2022/0130272 A1* | 4/2022 | Foroughi | G09B 7/00 | |
| 2023/0222184 A1* | 7/2023 | Safronoff | G06F 18/2178 | 706/15 |
| 2024/0078624 A1* | 3/2024 | MacQueen | G06Q 50/205 | |

FOREIGN PATENT DOCUMENTS

| | | |
|---|---|---|
| TW | 201723968 A | 7/2017 |
| TW | I686757 | 3/2020 |
| TW | I698770 | 7/2020 |
| TW | I733057 | 7/2021 |

* cited by examiner

SYSTEMS AND METHODS FOR GENERATING AND TRAINING A MODULE SELECTION ENGINE FOR DISTRIBUTION ALLOCATION IN A NETWORK ENVIRONMENT

FIELD OF THE INVENTION

The present invention embraces a system for generating and training a module selection engine for distribution allocation in a network environment.

BACKGROUND

Users, especially users who may have a managerial or controlling capacity over another user, have a harder time than ever before making sure the users they control are completing certain modules, tasks, and/or activities in an electronic network. This is especially true in today's remote environment, where employers may be remote from their many employees, or in today's environment where parents may wish to teach their children valuable life lessons regarding completing certain tasks, such as saving their resources, investing their resources, completing physical activities, and/or the like. A need, therefore, exists for a system to generate and train a module selection engine which may determine a plurality of modules to send to a controlled user (e.g., herein called a subordinate user) for distribution allocation in a network environment, such distribution allocation may comprise the distribution of a plurality of modules, the distribution of module interface components for presentation to the subordinate user and/or the supervisor (i.e., controlling user) user, the distribution of resources between accounts (e.g., between the subordinate user account and the supervisor user account, and/or from at least one of the subordinate user account or the supervisor user account), and/or the like.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for generating and training a module selection engine for distribution allocation is provided. In some embodiments, the system may comprise a memory device with computer-readable program code stored thereon; at least one processing device operatively coupled to the at least one memory device and the at least one communication device, wherein executing the computer-readable code is configured to cause the at least one processing device to: receive a subordinate user account identifier associated with a subordinate user account; determine a supervisor user account identifier associated with the subordinate user account identifier; apply a module selection engine to the subordinate user account identifier, wherein the module selection engine determines a plurality of modules to present to the subordinate user based on the subordinate user account identifier; generate, by the module selection engine, a plurality of module interface components to configure a graphical user interface associated with the subordinate user account, wherein the plurality of module interface components comprise data associated with the plurality of modules; transmit the plurality of module interface components to a user device associated with the subordinate user account; and determine a plurality of module completion statuses for each module of the plurality of module interface components, wherein the plurality of module completion statuses comprise data associated with a plurality of interactions by the subordinate user account with the plurality of module interface components.

In some embodiment, the processing device is further configured to: collect a set of supervisor-account-specific acceptable modules associated with the supervisor account identifier, the set of supervisor-account-specific acceptable modules comprising a plurality of modules previously indicated as acceptable by the supervisor user account; create a first training set comprising the collected set of supervisor-account-specific acceptable modules; and train the module selection engine in a first stage using the first training set. In some embodiments, the processing device is further configured to: create a second training set for a second stage of training comprising the first training set and a set of general acceptable modules; and train the module selection engine in a second stage using the second training set. In some embodiments, the processing device is further configured to: generate, by the module selection engine, a plurality of engagement levels of user accounts, wherein the plurality of engagement levels are based on a plurality of secondary user accounts; determine, by the module selection engine, a plurality of module set templates where each module set template is associated with an engagement level of the plurality of engagement levels; assign a specific-engagement level of the plurality of engagement levels to a supervisor user account associated with the supervisor user account identifier; determine an engagement-type module set template for the supervisor user account based on the specific-engagement level; and transmit an engagement-type module set template to the supervisor user account.

In some embodiments, the processing device is further configured to: determine, based on tracking the plurality of subordinate user account interactions, whether an activity-based module of the plurality of modules is completed by the subordinate user, wherein, in the instance where the subordinate user account has completed the activity-based module of the plurality of modules, automatically transmit a resource distribution from the supervisor user account to the subordinate user account, the resource distribution comprising a pre-determined distribution determined by the supervisor user account.

In some embodiments, the processing device is further configured to: determine, based on tracking the plurality of subordinate user account interactions, whether a transfer-based module of the plurality of modules is completed by the subordinate user, wherein, in the instance where the subordinate user account has completed a transfer-based module of the plurality of modules, automatically transmit a transfer-based resource distribution from the subordinate user account to a transfer-based account associated with the transfer-based module.

In some embodiments, the processing device is further configured to generate, by the module selection engine, a plurality of module set templates, wherein each module set template of the plurality of module set templates comprises a plurality of modules that are selected based on an intended module result.

In some embodiments, the processing device is further configured to: receive, from a supervisor user account associated with the supervisor user account identifier, a plurality of pre-selected module set templates; apply the module selection engine to the plurality of pre-selected module set templates; and generate, by the module selection engine, a plurality of module set templates.

In some embodiments, the processing device is further configured to generate, by the module selection engine, a plurality of timestamps for the transmission of the plurality of module interface components to the user device associated with the subordinate user account.

In another aspect, a computer program product for generating and training a module selection engine for distribution allocation is provided. The computer program product may comprise at least one non-transitory computer-readable medium having computer-readable program code portions embodied therein, the computer-readable program code portions which when executed by a processing device are configured to cause the processor to: receive a subordinate user account identifier associated with a subordinate user account; determine a supervisor user account identifier associated with the subordinate user account identifier; apply a module selection engine to the subordinate user account identifier, wherein the module selection engine determines a plurality of modules to present to the subordinate user based on the subordinate user account identifier; generate, by the module selection engine, a plurality of module interface components to configure a graphical user interface associated with the subordinate user account, wherein the plurality of module interface components comprise data associated with the plurality of modules; transmit the plurality of module interface components to a user device associated with the subordinate user account; and determine a plurality of module completion statuses for each module of the plurality of module interface components, wherein the plurality of module completion statuses comprise data associated with a plurality of interactions by the subordinate user account with the plurality of module interface components.

In some embodiments, the processing device is further configured to cause the processor to determine, based on tracking the plurality of subordinate user account interactions, whether an activity-based module of the plurality of modules is completed by the subordinate user, wherein, in the instance where the subordinate user account has completed the activity-based module of the plurality of modules, automatically transmit a resource distribution from the supervisor user account to the subordinate user account, the resource distribution comprising a pre-determined distribution determined by the supervisor user account.

In some embodiments, the processing device is further configured to cause the processor to determine, based on tracking the plurality of subordinate user account interactions, whether a transfer-based module of the plurality of modules is completed by the subordinate user, wherein, in the instance where the subordinate user account has completed a transfer-based module of the plurality of modules, automatically transmit a transfer-based resource distribution from the subordinate user account to a transfer-based account associated with the transfer-based module.

In some embodiments, the processing device is further configured to cause the processor to generate, by the module selection engine, a plurality of module set templates, wherein each module set template of the plurality of module set templates comprises a plurality of modules that are selected based on an intended module result.

In some embodiments, the processing device is further configured to cause the processor to: receive, from a supervisor user account associated with the supervisor user account identifier, a plurality of pre-selected module set templates; apply the module selection engine to the plurality of pre-selected module set templates; and generate, by the module selection engine, a plurality of module set templates.

In some embodiments, the processing device is further configured to cause the processor to generate, by the module selection engine, a plurality of timestamps for the transmission of the plurality of module interface components to the user device associated with the subordinate user account.

In another aspect, a computer-implemented method for generating and training a module selection engine for distribution allocation is provided. The computer-implemented method comprising: receiving a subordinate user account identifier associated with a subordinate user account; determining a supervisor user account identifier associated with the subordinate user account identifier; applying a module selection engine to the subordinate user account identifier, wherein the module selection engine determines a plurality of modules to present to the subordinate user based on the subordinate user account identifier; generating, by the module selection engine, a plurality of module interface components to configure a graphical user interface associated with the subordinate user account, wherein the plurality of module interface components comprise data associated with the plurality of modules; transmitting the plurality of module interface components to a user device associated with the subordinate user account; and determining a plurality of module completion statuses for each module of the plurality of module interface components, wherein the plurality of module completion statuses comprise data associated with a plurality of interactions by the subordinate user account with the plurality of module interface components.

In some embodiments, the computer-implemented method may further comprise determining, based on tracking the plurality of subordinate user account interactions, whether an activity-based module of the plurality of modules is completed by the subordinate user, wherein, in the instance where the subordinate user account has completed the activity-based module of the plurality of modules, automatically transmit a resource distribution from the supervisor user account to the subordinate user account, the resource distribution comprising a pre-determined distribution determined by the supervisor user account.

In some embodiments, the computer-implemented method may further comprise determining, based on tracking the plurality of subordinate user account interactions, whether a transfer-based module of the plurality of modules is completed by the subordinate user, wherein, in the instance where the subordinate user account has completed a transfer-based module of the plurality of modules, automatically transmit a transfer-based resource distribution from the subordinate user account to a transfer-based account associated with the transfer-based module.

In some embodiments, the computer-implemented method may further comprise generating, by the module selection engine, a plurality of module set templates, wherein each module set template of the plurality of module set templates comprises a plurality of modules that are selected based on an intended module result.

In some embodiments, the computer-implemented method may further comprise: receiving from a supervisor user account associated with the supervisor user account identifier, a plurality of pre-selected module set templates; applying the module selection engine to the plurality of pre-selected module set templates; and generating, by the module selection engine, a plurality of module set templates.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
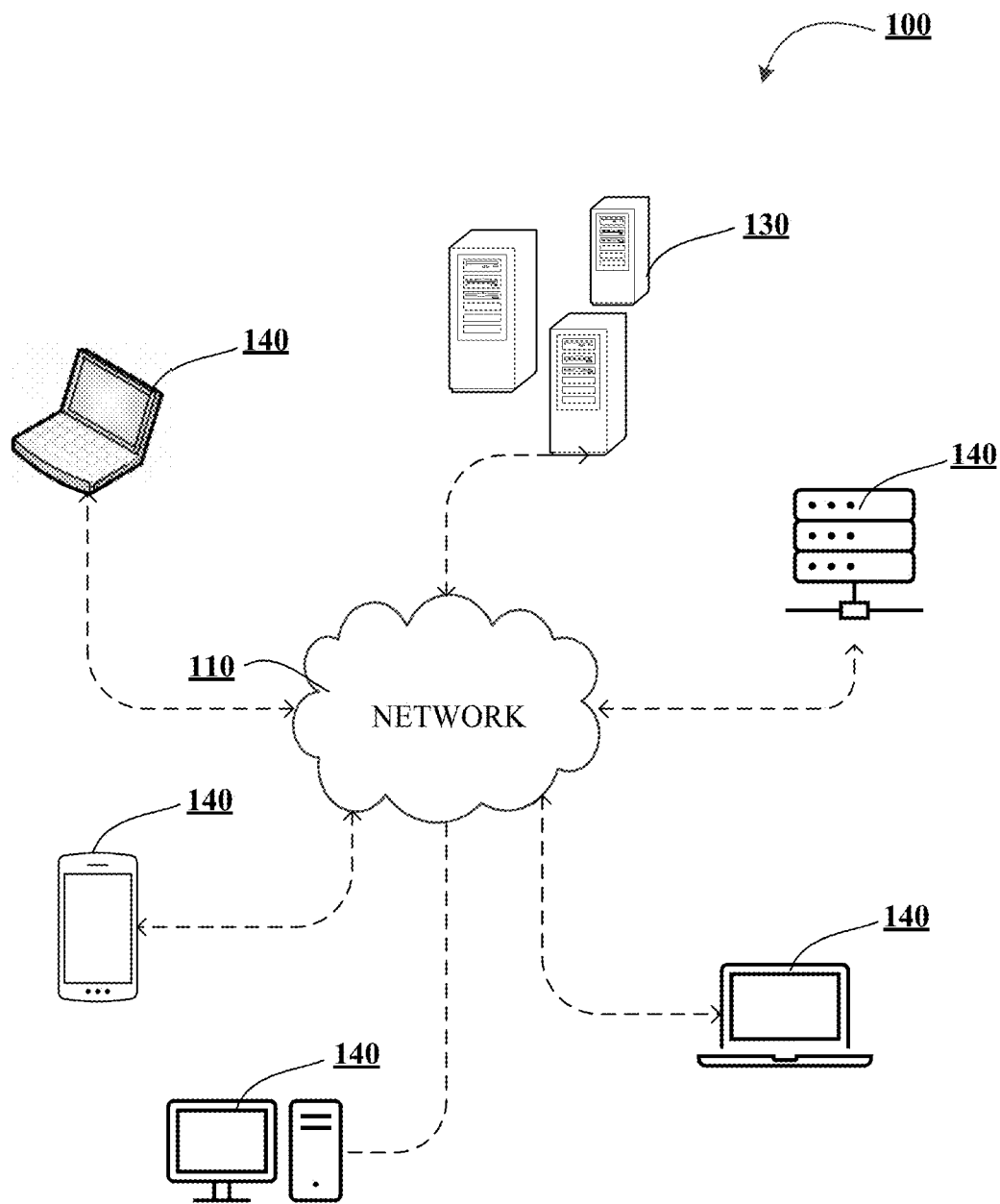
Figure 1B:
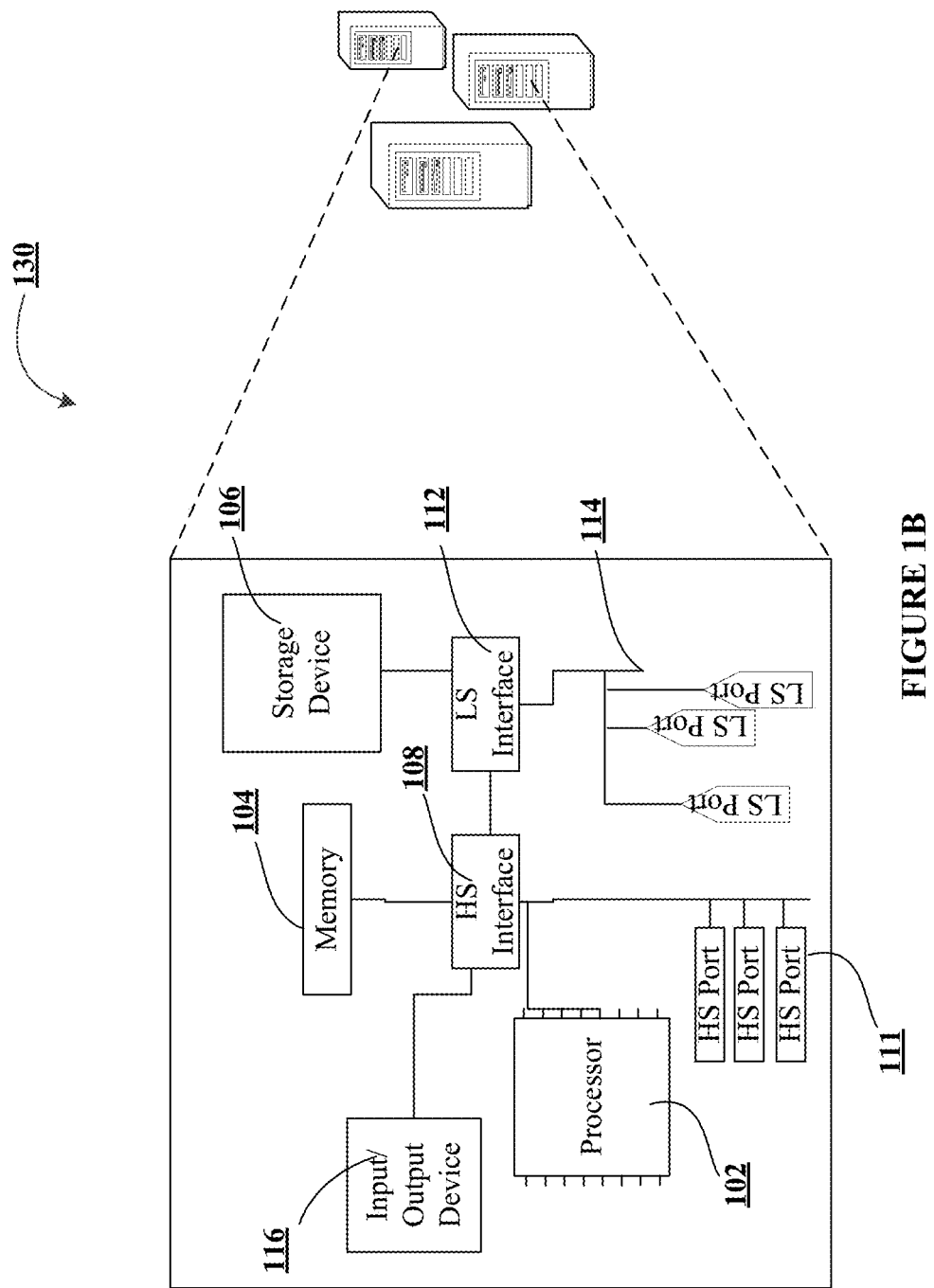
Figure 1C:
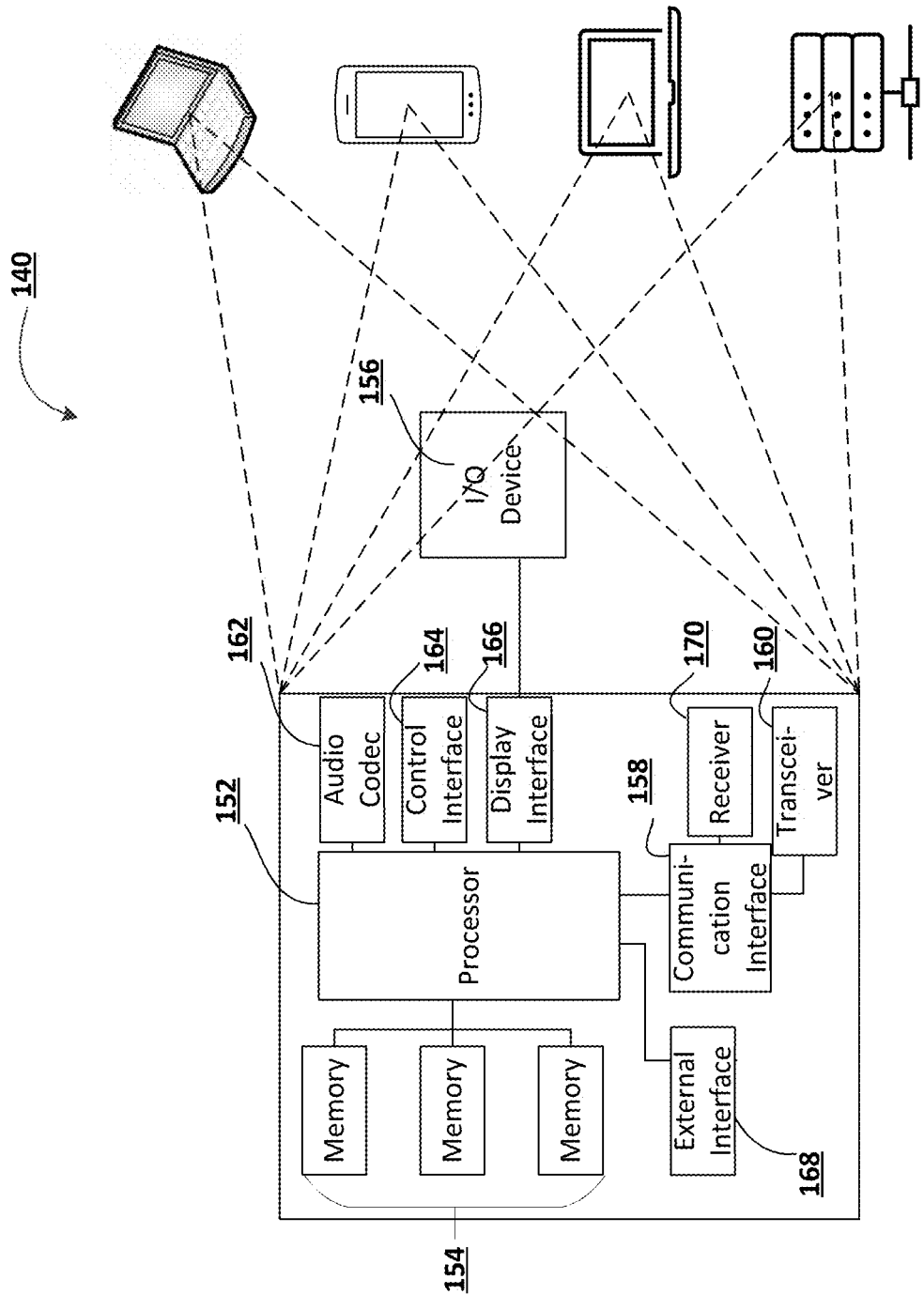
Figure 2:
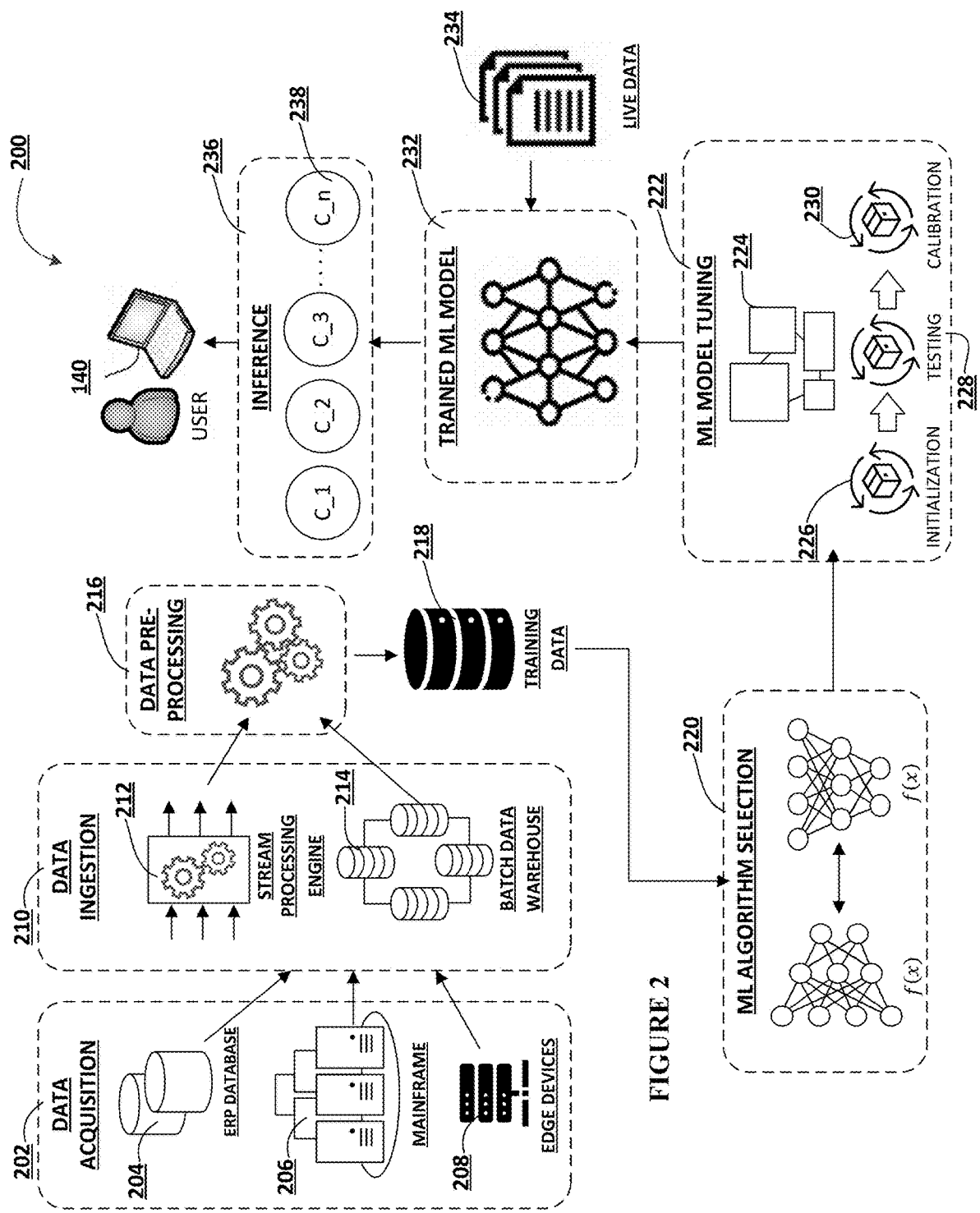
Figure 3:
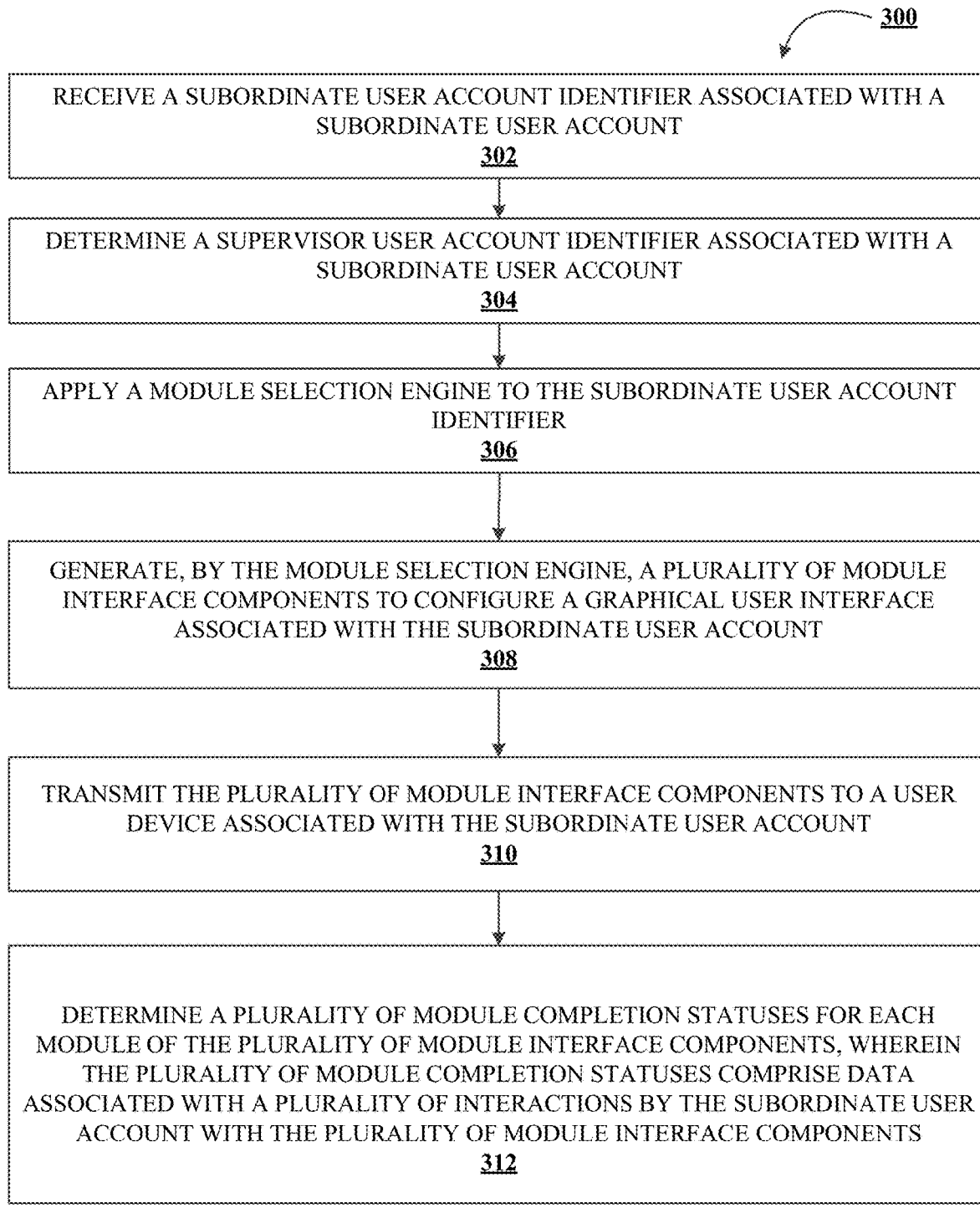
Figure 4:
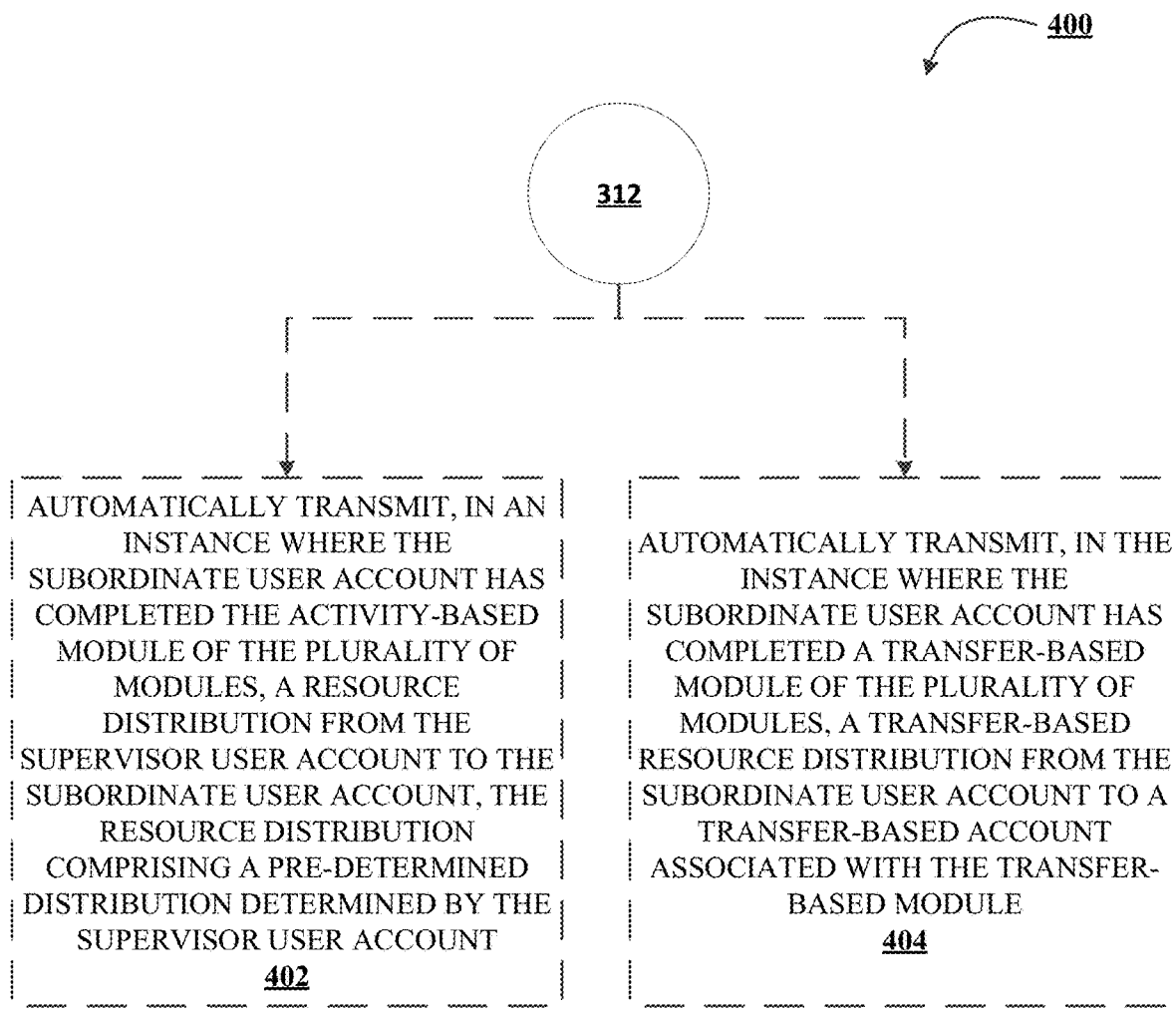
Figure 5:
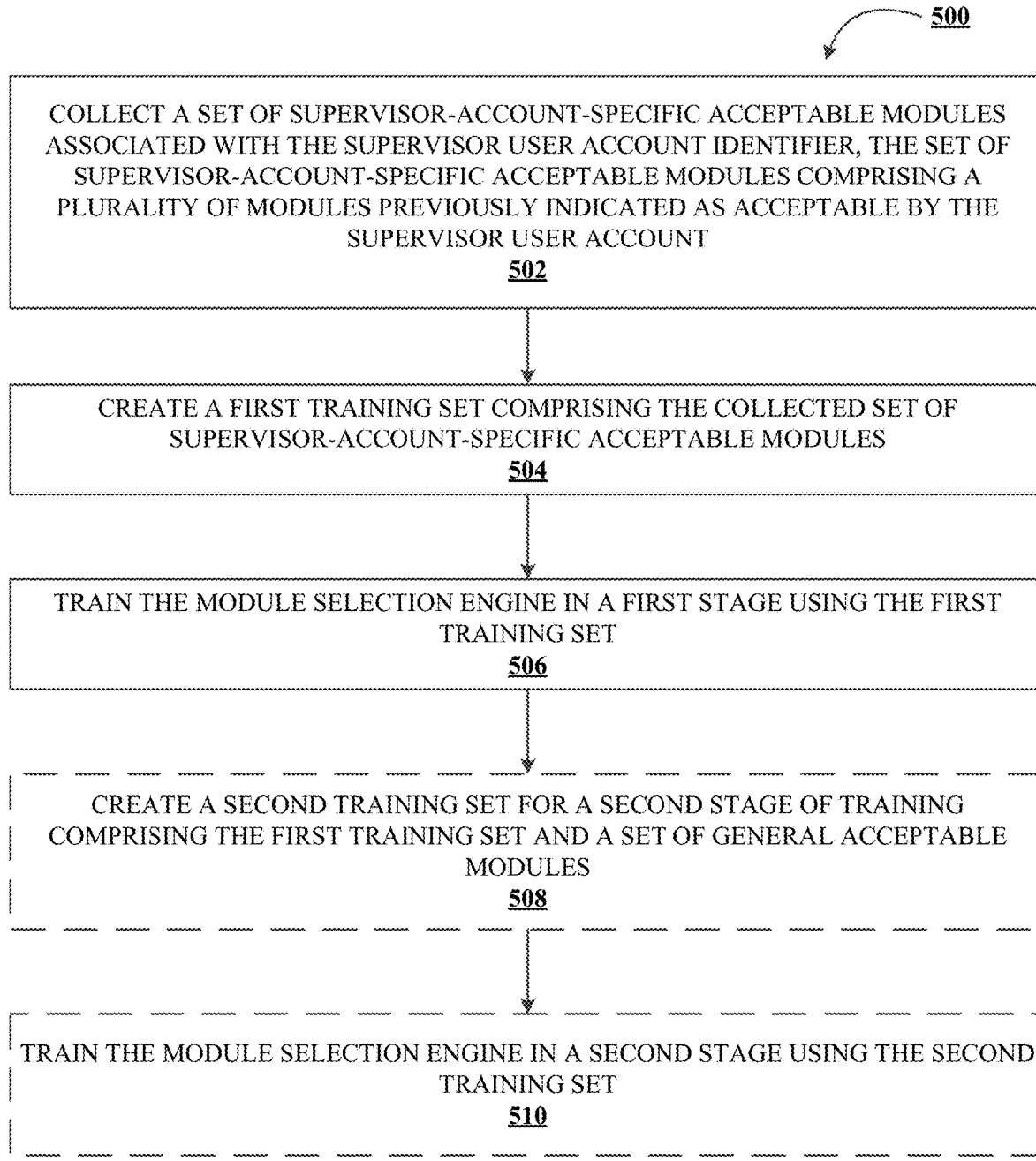
Figure 6:
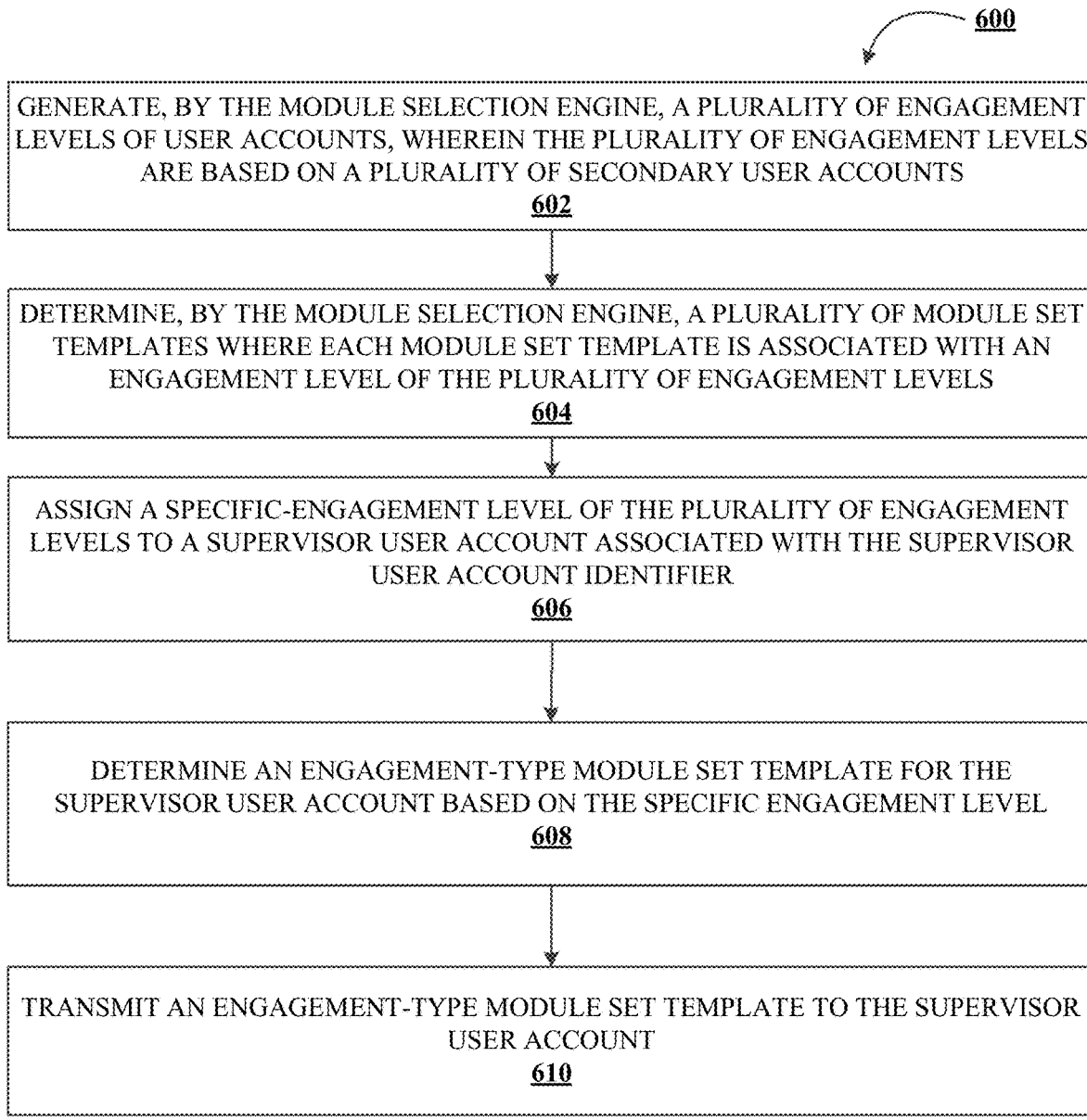
Figure 7:
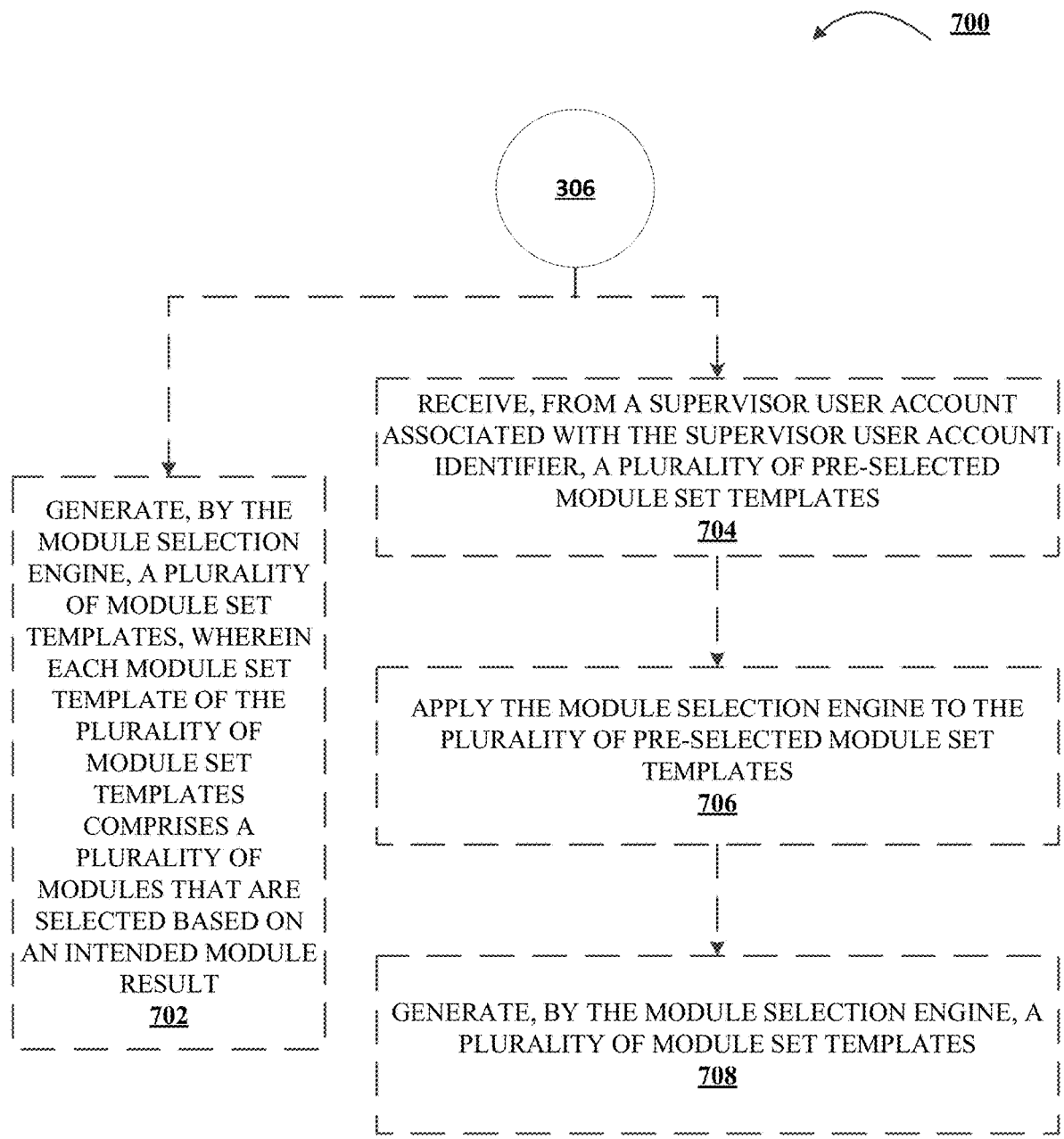

Having thus described embodiments of the invention in general terms, reference will now be made the accompanying drawings, wherein:

FIGS. 1A-1C illustrates technical components of an exemplary distributed computing environment for generating and training a module selection engine for distribution allocation in a network environment, in accordance with an embodiment of the invention;

FIG. 2 illustrates technical components of an exemplary module selection engine for generating and training a module selection engine for distribution allocation in a network environment, in accordance with an embodiment of the invention;

FIG. 3 illustrates a process flow for generating and training a module selection engine for distribution allocation in a network environment, in accordance with an embodiment of the invention;

FIG. 4 illustrates a process flow for transmitting a resource distribution from a user account in a plurality of instances, in accordance with an embodiment of the invention;

FIG. 5 illustrates a process flow for training a module selection engine, in accordance with an embodiment of the invention;

FIG. 6 illustrates a process flow for determining and transmitting an engagement-type module set template, in accordance with an embodiment of the invention; and FIG. 7 illustrates a process flow for generating a plurality of module set templates by a module selection engine, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As described in further detail herein, the present invention provides a solution to the above-referenced problems in the field of technology by generating an accurate, efficient, and secure system for selecting a plurality of modules to present to a user and determining a distribution allocation of the modules and/or of resources based on the completion of said modules, within a network environment. Such a system (e.g., module selection and tracking system) may offer a real-time tracking and parallel viewing of the module(s) as the module(s) are presented to a subordinate user, such that a supervisor user may accurately track completion of each module and such that a supervisor user may further train (e.g., indirectly train) a module selection engine to determine future modules to present to the subordinate user. This present invention solves the technical problem by implementing a module selection and tracking system, like that shown in FIGS. 1A-1C and 2. For instance, the module selection and tracking system acts to train a module selection engine for selection of a plurality of modules to present to at least a subordinate user account, track the subordinate user account's (e.g., subordinate user's) actions with respect to the plurality of modules, and determine a distribution based on a completion of the plurality of modules, such as a resource distribution. Such a module selection and tracking system acts to improve the control of a supervisor user account with respect to a selection of modules to present to a subordinate user, improve accuracy and efficiency in selecting and tracking of the module interactions by the subordinate user, and improve accuracy and efficiency in distributing resources based on such tracking. In some embodiments, the module selection and tracking system may further accurately and efficiently determine general modules and general templates of modules to present to a plurality of users based on a general populace of supervisor users, where such a determination by the module selection engine may reduce manual input of supervisor user accounts in order to select a module to present to a subordinate user account.

Accordingly, the present invention works by the module selection and tracking system receiving a subordinate user account identifier associated with a subordinate user account; and determining a supervisor user account identifier associated with the subordinate user account identifier and applying a module selection engine to the subordinate user account identifier, where the module selection engine determines a plurality of modules to present to the subordinate user based on the subordinate user account identifier. The module selection and tracking system may further generate, by the module selection engine, a plurality of module interface components to configure a graphical user interface associated with the subordinate user account, where the plurality of module interface components comprise data associated with the plurality of modules; and transmit the plurality of module interface components to a user device associated with the subordinate user account. Finally, the module selection and tracking system may determine a plurality of module completion statuses for each module of the plurality of module interface components, where the plurality of module completion statuses comprise data associated with a plurality of interactions by the subordinate user account with the plurality of module interface components.

What is more, the present invention provides a technical solution to a technical problem. As described herein, the technical problem includes the inability for prior systems to accurately and efficiently generate—on its own—a plurality of modules for presentation to a controlled user account and track—on its own—the interactions by the controlled user with the plurality of modules. The technical solution presented herein allows for the accurate and efficient selection/determination of a plurality of modules in a network environment, and the tracking—in real time—of the plurality of modules as the modules are interacted with in the network environment. In particular, the module selection and tracking system is an improvement over existing solutions to the module selection and tracking processes, (i) with fewer steps to achieve the solution, thus reducing the amount of computing resources, such as processing resources, storage resources, network resources, and/or the like, that are being used; (ii) providing a more accurate solution to problem, thus reducing the number of resources required to remedy any errors made due to a less accurate solution (e.g., accurately determining the plurality of modules for each subordinate user account and accurately tracking each interaction with the plurality of modules for resource distribution allocation and for future training of the module selection engine); (iii) removing manual input and waste from the implementation of the solution, thus improving speed and efficiency of the process and conserving computing resources (e.g., removing manual input by the supervisor user account and manual input of completion statuses by the subordinate user account); (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for generating and training a module selection engine for distribution allocation in a network environment 100, in accordance with an embodiment of the invention. As shown in FIG. 1A, the distributed computing environment 100 contemplated herein may include a system 130 (i.e., a module selection and tracking), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200 (also referred to herein as a module selection engine), in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for generating and training a module selection engine for distribution allocation in a network environment, in accordance with an embodiment of the invention. In some embodiments, a system (e.g., similar to one or more of the systems described herein with respect to FIGS. 1A-1C and 2) may perform one or more of the steps of process flow 300. For example, a module selection and tracking system (e.g., the system 130 described herein with respect to FIGS. 1A-1C) may perform the steps of process flow 300.

As shown in block 302, the process flow 300 may include the step of receiving a subordinate user account identifier associated with a subordinate user account. The subordinate user account may refer to a user account that is subsidiary, managed, and/or controlled by a by a different user account, such as the supervisor user account. For instance, the subordinate user account and its associated resources may be supervised and/or controlled by the supervisor user account. In some embodiments, and by way of non-limiting example, the subordinate user and the supervisor user may comprise a child/parent relationship, an employee/employer or manager relationship, a ward/guardian relationship, and/or the like.

In some embodiments, the module selection and tracking system may receive the subordinate user account identifier by a user device of the subordinate user. By way of non-limiting example, a subordinate user may interact with a configured graphical user interface (e.g., configured by the module selection and tracking system to request authentication credentials of the user, such as the subordinate user and/or the supervisor user) and the input received at the configured graphical user interface (e.g., authentication credentials) may be transmitted to the module selection and tracking system over a network, such as network 110 of FIG. 1A. In some embodiments, and based on the authentication credentials, the subordinate user account identifier may be received by the module selection and tracking system based on the authentication credentials input.

In some embodiments, and after such authentication credentials have been received, the module selection and tracking system may generate the subordinate user account identifier based on the authentication credentials of the subordinate. In some embodiments, the subordinate user account identifier may match at least a portion of the authentication credentials input by the subordinate user, such as a username, email, phone number, and/or the like, such that the subordinate user account identifier uniquely identifies the subordinate user account.

As shown in block 304, the process flow 300 may include the step of determining a supervisor user account identifier associated with subordinate user account. By way of non-limiting example, the module selection and tracking system may determine and/or generate the supervisor user account identifier based on the subordinate user account identifier and the association of the subordinate account to a supervisor account. For instance, the module selection and tracking system may store the associations between a subordinate user account and the supervisor user account(s), and any additional associations of each supervisor user account to other subordinate user accounts (e.g., where a parent, guardian, employer/manager, and/or the like is associated with a plurality of children, wards, employees, and/or the like). Such relationships and associations may be shown as nodes within a memory (e.g., memory 104 and/or memory 154) of the module selection and tracking system.

In some embodiments, the supervisory user account identifier may be input by a supervisor user by way of a configured graphical user interface of a user device associated with the supervisor user. For instance, the module selection and tracking system may receive authentication credentials for the supervisor user account and then may, based also on the determination of the subordinate user account identifier, generate an association between the supervisor user and the subordinate user. In some embodiments, this process may be used to generate an association between the subordinate account and supervisor account which may be stored in the module selection and tracking system (e.g., memory 104 and memory 154). In some embodiments, the association may be indicated by nodes between the identifiers.

As shown in block 306, the process flow 300 may include the step of applying a module selection engine to the subordinate user account identifier. By way of non-limiting example, by applying the module selection engine to the subordinate user account identifier, the module selection and tracking system may identify specific modules to present to the subordinate user. Such specific modules may be based on selections previously made by the supervisor user account associated with the subordinate user account. For instance, and where a single supervisor user account is associated with a plurality of subordinate user accounts (e.g., the supervisor user has many children, many wards, and/or many employees), and the supervisor user has pre-selected modules for the plurality of subordinate user accounts for training of the module selection engine, the module selection engine may only determine a plurality of modules to present to the specific subordinate user associated with the subordinate user account identifier that was input to the module selection engine. The training of the module selection engine and the generation of the plurality of modules to present to the subordinate user are discussed in further detail below with respect to FIGS. 5, 6, and 7.

As shown in block 308, the process flow 300 may include the step of generating, by the module selection engine, a plurality of module interface components to configure a graphical user interface associated with the subordinate user account. In some embodiments, the module selection and tracking system may generate a plurality of module interface components to configure a graphical user interface of a user device (e.g., a user device associated with a subordinate user and/or a user device associated with a supervisor user). By way of non-limiting example, the plurality of module interface components may be generated based on the plurality of modules determined by the module selection engine and the associated data of the determined plurality of modules. For instance, the module selection engine may generate the interface components to be transmitted from the module selection and tracking system to a plurality of user devices for configuring the graphical user interfaces of the user device(s), and the module selection and tracking system may transmit the interface components. In this manner, the plurality of module interface components may be generated and transmitted to the plurality of user devices, and in some embodiments, may be used by the module selection and tracking system for tracking of interactions by the user(s) with the interface components.

As shown in block 310, the process flow 300 may include the step of transmitting the plurality of module interface components to a user device associated with the subordinate user account. By way of non-limiting example, the module selection and tracking system may transmit a plurality of module interface components to configure the graphical user interface of the user device associated with the subordinate user, where the plurality of module interface components are associated with the plurality of modules that were determined and/or selected by the module selection engine. Such module interface components may be generated to show the data associated with each module of the plurality of modules selected by the module selection engine.

In some embodiments, the module selection and tracking system may transmit the plurality of module interface components to a plurality of user devices, such as the user device(s) associated with the subordinate user account(s) and/or the supervisor user account(s). For instance, the module selection and tracking system may transmit the plurality of module interface components to the supervisor user account(s), such as a plurality of supervisor user accounts where there may be multiple parent users for each subordinate user, multiple guardians for each subordinate user, multiple employers for each subordinate user, and/or the like. In some embodiments, the module selection and tracking system may transmit the plurality of module interface components to the supervisor user account(s) to show the supervisor user account(s) what each subordinate user is viewing. In some embodiments, the transmission of the plurality of module interface components may be transmitted to the plurality of supervisor user accounts in real time, such as at the same time the plurality of interface components are transmitted to the user devices associated with the subordinate user account. In some embodiments, the transmission of the plurality of module interface components may be transmitted to the plurality of supervisor user accounts in real time, such as at the time the subordinate user is viewing (e.g., the time at which each interface component configures the graphical user interface of the subordinate user account's user device) a module of the plurality of modules.

As shown in block 312, the process flow 300 may include the step of determining a plurality of module completion statuses for each module of the plurality of module interface components, wherein the plurality of module completion statuses comprise data associated with a plurality of interactions by the subordinate user account with the plurality of module interface components. By way of non-limiting example, the module selection and tracking system may track and/or determine each module (e.g., by way of tracking the associated module interface components) as they are completed by the subordinate user (e.g., viewed fully where the module is a video, activities are completed where the modules include directions for the subordinate user to act out, approved of where the module requests that the subordinate user account distribute a resource to a specific account, and/or the like).

In some embodiments, and where the module from the plurality of modules comprises an activity to be completed by the subordinate user, the module selection and tracking system may track other interactions within the module selection and tracking system and its interface components to configure the subordinate user's user device (e.g., user components that are configured for each portion of the activity). For instance, a module of the plurality of modules may comprise an activity such as the instructions for the subordinate user to distribute resources to a specific place and/or account (e.g., a savings account, an investment account, and/or the like). By way of non-limiting example, the module selection and tracking system may determine the subordinate user has completed the activity by tracking whether the subordinate user has distributed the specified resources to the correct place and/or account by way of tracking the subordinate user interactions on the subordinate user's user device. In some embodiments, the module interface components associated with the module may comprise indicators for the subordinate user to select when an activity has been completed (e.g., a checkmark box requesting an indication that the activity has been completed).

In some embodiments and where the module of a plurality of modules is associated with a video the subordinate user is tasked with watching, the module selection and tracking system may track the interactions of the subordinate user's user device as it interacts with the module interface component comprising the video. For instance, the module selection and tracking system may track the completeness of the video being watched by the subordinate user and, based on this completeness, the module selection and tracking system may generate an indication that the module of the plurality of modules was completed.

FIG. 4 illustrates a process flow 400 for transmitting a resource distribution from a user account in a plurality of instances, in accordance with an embodiment of the invention. In some embodiments, a system (e.g., similar to one or more of the systems described herein with respect to FIGS.

1A-1C and 2) may perform one or more of the steps of process flow 400. For example, a module selection and tracking system (e.g., the system 130 described herein with respect to FIGS. 1A-1C) may perform the steps of process flow 400.

In some embodiments, and as shown in block 402, the process flow 400 may include the step of automatically transmitting, in an instance where the subordinate user account has completed the activity-based module of the plurality of modules, a resource distribution from the supervisor user account to the subordinate user account, the resource distribution comprising a pre-determined distribution by the supervisor user account. In some embodiments, and by way of non-limiting example, the module selection and tracking system may automatically transmit a resource distribution from the supervisor user account to the subordinate user account, once the module selection and tracking system has determined the module of the plurality of modules has been completed. For instance, and as described above, once the module selection and tracking system has determined the module has been completed for an activity-based module (e.g., watching a specified video, completing a physical activity—such as a task, and/or the like), the module selection and tracking system may automatically generate a distribution of resources from the supervisor account to the subordinate account. In some embodiments, this distribution of resources may be pre-determined by the supervisor user, and/or by both the supervisor user and the subordinate user. In some embodiments, the module selection engine may determine the distribution of resources (e.g., an amount of resources) for each module and its associated completion.

In some embodiments, and as shown in block 404, the process flow 400 may include the step of automatically transmitting, in the instance where the subordinate user account has completed a transfer-based module of the plurality of modules, a transfer-based resource distribution from the subordinate user account to a transfer-based account associated with the transfer-based module. In some embodiments, and by way of non-limiting example, the module selection and tracking system may automatically transmit a resource distribution from the supervisor user account to the subordinate user account, once the module selection and tracking system has determined the module of the plurality of modules has been completed. For instance, and as described above, once the module selection and tracking system has determined the module has been completed for a transfer-based module (e.g., distribution of a resource from the subordinate account to a different account—such as a savings account, investment account, charitable giving account, checking account, and/or the like), the module selection and tracking system may automatically generate a distribution of resources from the supervisor account to the subordinate user account. In some embodiments, this distribution of resources may be pre-determined by the supervisor user, and/or by both the supervisor user and the subordinate user. In some embodiments, the module selection engine may determine the distribution of resources (e.g., an amount of resources) for each module and its associated completion.

FIG. 5 illustrates a process flow 500 for training a module selection engine, in accordance with an embodiment of the invention. In some embodiments, a system (e.g., similar to one or more of the systems described herein with respect to FIGS. 1A-1C and 2) may perform one or more of the steps of process flow 500. For example, a module selection and tracking system (e.g., the system 130 described herein with respect to FIGS. 1A-1C) may perform the steps of process flow 500.

As shown in block 502, the process flow 500 may include the step of collecting a set of supervisor-account-specific acceptable modules associated with the supervisor user account identifier, the set of supervisor-account-specific acceptable modules comprising a plurality of modules previously indicated as acceptable by the supervisor user account. By way of non-limiting example, the module selection and tracking system may collect a set of supervisor-account-specific acceptable modules associated with the supervisor user account by reviewing a set of modules that the supervisor user previously selected as being acceptable to present to the subordinate user. Such previously selected modules may be used by the module selection and tracking system to train the module selection engine for specific subordinate user accounts.

In some embodiments, the module selection and tracking system may use the previously selected modules selected by the supervisor user account to train the module selection engine to select potential modules for presentation to the supervisor user accounts for further training, such as by way of a feedback loop (e.g., by presenting the potential modules to the supervisor user for prior approval before transmitting the module interface components associated with the potential modules to the subordinate user's user device). In some embodiments, the module selection and tracking system may use the previously selected modules selected by the supervisor user account to select modules to send the subordinate user account without prior approval from the supervisor user account.

In some embodiments, the module selection engine may be trained by the previously selected modules and associated selected times to transmit the module interface components to the subordinate account to generate a plurality of time-stamps to transmit the module interface components to the user device associated with the subordinate user. For instance, the module selection engine may determine—based on data collected from the supervisor user account, including data indicating when the supervisor user account would send the previously selected modules to the subordinate user account as a module interface component—when to transmit the module interface components generated by the module selection engine to the subordinate user account(s) at a future time.

As shown in block 504, the process flow 500 may include the step of creating a first training set comprising the collected set of supervisor-account-specific acceptable modules. By way of non-limiting example, the module selection and tracking system may generate first training set comprising the collected set of supervisor-account-specific acceptable modules for input to the module selection engine for training. In some embodiments, the first training set may comprise data regarding each module that was previously selected by the supervisor user account as acceptable for the subordinate user account, which may further comprise the timestamp data of each module interface component of the previously selected module.

As shown in block 506, the process flow 500 may include the step of training the module selection engine at a first stage using the first training set. By way of non-limiting example, the module selection engine may be trained by the first training set by inputting the first training set to the module selection engine.

In some embodiments, and as shown in block 508, the process flow 500 may include the step of creating a second training set for a second stage of training comprising the first training set and a set of general acceptable modules. By way of non-limiting example, the module selection and tracking system may generate a second training set by further generating and/or collecting a set of general acceptable modules and adding the set of the general acceptable modules to the first training set. The general acceptable modules may be referred to as those modules that have been accepted by a general populace of the supervisor user accounts. For instance, such a general populace of supervisor user accounts may be based on a plurality of supervisor user accounts in a specified geographic area (e.g., same town, same city, same state, same country, and/or the like), a specified maturity range (e.g., within one year of other supervisor users, within two years of specified users, within five years of other supervisor users, within ten years of other specified users, and/or the like), a specified type of supervisor user account (e.g., a parent user account, a guardian user account, a manager/employer user account), and/or the like. The module selection and tracking system, based on these demarcations between supervisor user accounts within the module selection and tracking system, may generate a general populace of the supervisor user accounts for each type, and based on each general populace, may collect each supervisor user account's previously selected modules. Each of the previously selected modules may then, in some embodiments, be used to generate the general acceptable modules to train the module selection engine(s).

In some embodiments, and as shown in block 510, the process flow 500 may include the step of training the module selection engine in a second stage using the second training set. By way of non-limiting example, the module selection and tracking system may input the second training set to the module selection engine for further training, where the second training set may train the module selection engine to identify generally accepted modules for the general populace of supervisor user accounts.

FIG. 6 illustrates a process flow 600 for determining and transmitting an engagement-type module set template, in accordance with an embodiment of the invention. In some embodiments, a system (e.g., similar to one or more of the systems described herein with respect to FIGS. 1A-1C and 2) may perform one or more of the steps of process flow 600. For example, a module selection and tracking system (e.g., the system 130 described herein with respect to FIGS. 1A-1C) may perform the steps of process flow 600.

As shown in block 602, the process flow 600 may include the step of generating, by the module selection engine, a plurality of engagement levels of user accounts, wherein the plurality of engagement levels are based on a plurality of secondary user accounts. By way of non-limiting example, the module selection and tracking system may determine a plurality of engagement levels based on a level of controlling that the supervisor user may comprise, such as a supervisor user that is considered more controlling or hands-on, a supervisor user that is average (e.g., in between more controlling and less controlling and which fit into a general populace of other supervisor users), a supervisor user that is less controlling and less hands-on, and/or the like. For instance, the plurality of engagement levels may be based on a general populace of secondary user accounts (e.g. other supervisor user accounts within the module selection and tracking system), whereby the module selection and tracking system may determine each engagement level based on the type of control each secondary user account uses.

As shown in block 604, the process flow 600 may include the step of determining, by the module selection engine, a plurality of module set templates where each module set templates is associated with an engagement level of the plurality of engagement levels. The plurality of module set templates may refer to a set of modules to present to subordinate user accounts, where the set of modules may be based on specific engagement levels. For instance, and where the engagement level is average, the module selection and tracking system may generate the set of modules as a module set template which may comprise those modules where the general populace of supervisor user accounts are of an average engagement level and have also pre-selected the modules.

Similarly, and where the engagement level is of a higher degree of controlling and/or a higher degree of hands-on monitoring of the modules being presented to the subordinate user account, the module selection engine may determine a module set template comprising a plurality of modules where the general populace of supervisor user accounts are of a higher degree of controlling and/or a higher degree of hands-on monitoring. In some embodiments, the higher degree of hands-on monitoring of the modules may comprise the module interface components to be transmitted to both user devices associated with the subordinate user account and the supervising user account (e.g., the supervisor user account is update, in real-time, at each instance a module interface component is transmitted to the subordinate user account user device and/or the supervisor user account is updated at each instance where the subordinate user account completes a module).

Similarly, and where the engagement level is a of a lower degree of controlling and/or hands-off monitoring of the modules being presented to the subordinate user account, the module selection engine may determine a module set template comprising a plurality of modules where the general populace of supervisor user accounts are of a lower degree of controlling and/or a lower degree of hands-on monitoring (i.e., hands-off monitoring). In some embodiments, some hands-off monitoring of modules may comprise modules where module interface components are transmitted to the subordinate user account, only, and are not transmitted to the supervisor user account (e.g., the supervisor user account are not updated, in real-time, at each instance a module is presented to the subordinate user account).

As shown in block 606, the process flow 600 may include the step of assigning a specific-engagement level of the plurality of engagement levels to a supervisor user account associated with the supervisor user account identifier. By way of non-limiting example, the module selection and tracking system may assign an engagement level to each supervisor user account based on the previously selected modules by each supervisor user account. In some embodiments, and by way of non-limiting examples, the module selection engine may determine and/or assign each supervisor user account (e.g., supervisor user account identifier) to an engagement level. Each engagement level may be assigned to each supervisor user account based on previously selected modules for the associated subordinate user account(s), where each engagement level may be based on what each module belongs to with respect to an engagement level type. In some embodiments, a single supervisor user account may comprise multiple engagement levels, where an engagement level (e.g., a different or similar engagement level) may be assigned to the supervisor user account for each of the supervisor user account's associated subordinate user account(s).

As shown in block 608, the process flow 600 may include the step of determining an engagement-type module set template for the supervisor user account based on the specific engagement level. By way of non-limiting example, the module selection and tracking system and/or the module selection engine of the module selection and tracking system may determine an engagement-type module set template for each supervisor user account and/or for each subordinate user account (e.g., where a single supervisor user account is associated with multiple subordinate user accounts). In some embodiments, the module selection and tracking system may generate an engagement-type module set template by collecting a set of modules comprising the same and/or a similar engagement level, such that the plurality of modules used to generate the engagement-level module set template comprises the same engagement level of the specific-engagement level. In some embodiments and based on the engagement-type module set template generated for the supervisor user account (and/or subordinate user account), the modules of the engagement-type module set template may be transmitted as a plurality of module interface components to the user device associated with the subordinate user account.

As shown in block 610, the process flow 600 may include the step of transmitting an engagement-type module set template to the supervisor user account. In some embodiments, the module selection and tracking system may transmit the engagement-type module set template to the supervisor user account (e.g., by way of transmitting an interface component to configure the graphical user interface of the user device associated with the supervisor user account) for approval before transmitting the plurality of modules (e.g., module interface components) associated with the engagement-type module set template to the subordinate user account. By way of non-limiting example, the supervisor user account may approve each module of the engagement-type module set template before each module is transmitted to the subordinate user (e.g., as a module interface component). For instance, and where the supervisor user account does not approve a module in the engagement-type module set template, the module selection engine may be trained for future determinations of the plurality of module set templates and associated modules. In some embodiments, and upon approval of the modules of the engagement-type module set template, the module interface components associated with the approved modules may be transmitted to the user device associated with the subordinate user device.

FIG. 7 illustrates a process flow 700 for generating a plurality of module set templates by a module selection engine, in accordance with an embodiment of the invention. In some embodiments, a system (e.g., similar to one or more of the systems described herein with respect to FIGS. 1A-1C and 2) may perform one or more of the steps of process flow 700. For example, a module selection and tracking system (e.g., the system 130 described herein with respect to FIGS. 1A-1C) may perform the steps of process flow 700.

In some embodiments, and as shown in block 702, the process flow 700 may include the step of generating, by the module selection engine, a plurality of module set templates, wherein each module set template of the plurality of module set templates comprises a plurality of modules that are selected based on an intended module result. By way of non-limiting example, the module selection and tracking system may use the module selection engine to generate a plurality of module set templates comprising a plurality of modules to present to the subordinate user, where the plurality of modules may be determined based on an intended result. Such an intended result may be based on a result intended by the supervisor user account, such as the intended result of the subordinate user distributing resources to a specific account to reach a certain resource amount, the subordinate user learning from a plurality of modules (e.g., based on educational videos and/or educational articles within a plurality of modules), the subordinate user completing a certain task (e.g., an activity-based module instructing the subordinate user to complete a task or activity), and/or the like. In some embodiments, the module selection engine may be trained to determine intended results of each module, individually, and may then generate each module selection template by collecting each module into a template set based on the same and/or similar intended result.

In some embodiments, and upon the generation of the plurality of module set templates for a plurality of intended module results, the module selection and tracking system may transmit a plurality of module interface components that are associated with the modules of the module set templates to a user device of the subordinate user account and/or a user device of the supervisor user account. In some embodiments, the module selection and tracking system may transmit only the modules (e.g., module interface components) of a selected, such as selected by the module selection engine itself or selected by the supervisor user account, module set template.

In some embodiments, and as shown in block 704, the process flow 700 may include the step of receiving, from a supervisor user account associated with the supervisor user account identifier, a plurality of pre-selected module set templates. By way of non-limiting example, the module selection and tracking system may receive—from a supervisor user account—a plurality of pre-selected module set templates which are pre-selected by the supervisor user account and may be used to train the module selection engine. The pre-selected module set templates may comprise a plurality of pre-selected modules that were approved by the supervisor user account for the associated subordinate user account(s).

In some embodiments, and as shown in block 706, the process flow 700 may include the step of applying the module selection engine to the plurality of pre-selected module set templates. By way of non-limiting example, the module selection engine may be trained by the plurality of pre-selected module set templates in order to identify patterns regarding the supervisor user account and its associated accepted modules. In some embodiments, such pre-selected modules and associated pre-selected module set templates may be based on an intended result for the pre-selected module set templates.

In some embodiments, and as shown in block 708, the process flow 700 may include the step of generating, by the module selection engine, a plurality of module set templates. By way of non-limiting example, the module selection and tracking system (e.g., by way of the module selection engine) may generate a plurality of module set templates for the supervisor user account which may comprise potential modules to present to the supervisor user account based on the pre-selected module set templates identified by the module selection and tracking system for the supervisor user account.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating and training a module selection engine for distribution allocation, the system comprising:
    a memory device with computer-readable program code stored thereon;
    at least one processing device operatively coupled to the at least one memory device and the at least one communication device, wherein executing the computer-readable code is configured to cause the at least one processing device to:
    receive, by the at least one processing device, a subordinate user account identifier associated with a subordinate user account;
    determine, by the at least one processing device, a supervisor user account identifier associated with the subordinate user account identifier;
    train a module selection engine with a set of supervisor-account-specific acceptable modules associated with the supervisor account identifier, the set of supervisor-account-specific acceptable modules comprising a plurality of modules previously indicated as acceptable by the supervisor user account for the subordinate user;
    apply the trained module selection engine to the subordinate user account identifier, wherein the module selection engine determines a plurality of modules to present to the subordinate user based on the subordinate user account identifier;
    generate, by the trained module selection engine, a plurality of module interface components for the subordinate user;
    transmit, over a network associated with the at least one processing device, the plurality of module interface components to a supervisor user device associated with the supervisor user account identifier;

receive, in response to the transmission of the plurality of module interface components to the supervisor user device, an approval of at least one module interface component for the subordinate user;

retrain the trained module selection engine using the approved at least one module interface component;

select, by the trained module selection engine and in response to the retraining of the trained module selection engine, at least one updated module interface component;

transmit, over a network associated with the at least one processing device, at least one updated module interface component to a subordinate user device associated with the subordinate user account identifier, wherein the at least one updated module interface component configures a graphical user interface of the subordinate user device associated with the subordinate user account; and determine a plurality of module completion statuses for each module of the at least one updated module interface component, wherein the plurality of module completion statuses comprise data associated with a plurality of interactions by the subordinate user account with the at least one updated module interface component.

2. The system of claim 1, wherein the at least one processing device is further configured to:

collect the set of supervisor-account-specific acceptable modules associated with the supervisor account identifier, the set of supervisor-account-specific acceptable modules comprising a plurality of modules previously indicated as acceptable by the supervisor user account;

create a first training set comprising the collected set of supervisor-account-specific acceptable modules; and train the module selection engine in a first stage using the first training set at a first instance.

3. The system of claim 2, wherein the at least one processing device is further configured to:

create a second training set for a second stage of training comprising the first training set and a set of general acceptable modules; and train the module selection engine in a second stage using the second training set.

4. The system of claim 3, wherein the at least one processing device is further configured to:

generate, by the trained module selection engine, a plurality of engagement levels of user accounts, wherein the plurality of engagement levels are based on a plurality of secondary user accounts;

determine, by the trained module selection engine, a plurality of module set templates where each module set template is associated with an engagement level of the plurality of engagement levels;

assign a specific-engagement level of the plurality of engagement levels to a supervisor user account associated with the supervisor user account identifier;

determine an engagement-type module set template for the supervisor user account based on the specific-engagement level; and transmit an engagement-type module set template to the supervisor user account.

5. The system of claim 1, wherein the at least one processing device is further configured to:

determine, based on tracking the plurality of subordinate user account interactions, whether an activity-based module of the plurality of modules is completed by the subordinate user, wherein, in the instance where the subordinate user account has completed the activity-based module of the plurality of modules, automatically transmit a resource distribution from the supervisor user account to the subordinate user account, the resource distribution comprising a pre-determined distribution determined by the supervisor user account.

6. The system of claim 1, wherein the at least one processing device is further configured to:

determine, based on tracking the plurality of subordinate user account interactions, whether a transfer-based module of the plurality of modules is completed by the subordinate user, wherein, in the instance where the subordinate user account has completed a transfer-based module of the plurality of modules, automatically transmit a transfer-based resource distribution from the subordinate user account to a transfer-based account associated with the transfer-based module.

7. The system of claim 1, wherein the at least one processing device is further configured to:

generate, by the trained module selection engine, a plurality of module set templates, wherein each module set template of the plurality of module set templates comprises a plurality of modules that are selected based on an intended module result.

8. The system of claim 1, wherein the at least one processing device is further configured to:

receive, from a supervisor user account associated with the supervisor user account identifier, a plurality of pre-selected module set templates;

apply the trained module selection engine to the plurality of pre-selected module set templates; and generate, by the trained module selection engine, a plurality of module set templates.

9. The system of claim 1, wherein the at least one processing device is further configured to:

generate, by the module selection engine, a plurality of timestamps for the transmission of the plurality of module interface components to the user device associated with the subordinate user account.

10. A computer program product for generating and training a module selection engine for distribution allocation, wherein the computer program product comprises at least one non-transitory computer-readable medium having computer-readable program code portions embodied therein, the computer-readable program code portions which when executed by a processing device are configured to cause the processing device to:

receive, by the at least one processing device, a subordinate user account identifier associated with a subordinate user account;

determine, by the at least one processing device, a supervisor user account identifier associated with the subordinate user account identifier;

train a module selection engine with a set of supervisor-account-specific acceptable modules associated with the supervisor account identifier, the set of supervisor-account-specific acceptable modules comprising a plurality of modules previously indicated as acceptable by the supervisor user account for the subordinate user;

apply the trained module selection engine to the subordinate user account identifier, wherein the module selection engine determines a plurality of modules to present to the subordinate user based on the subordinate user account identifier;
generate, by the trained module selection engine, a plurality of module interface components for the subordinate user;
transmit, over a network associated with the at least one processing device, the plurality of module interface components to a supervisor user device associated with the supervisor user account identifier;
receive, in response to the transmission of the plurality of module interface components to the supervisor user device, an approval of at least one module interface component for the subordinate user;
retrain the trained module selection engine using the approved at least one module interface component;
select, by the trained module selection engine and in response to the retraining of the trained module selection engine, at least one updated module interface component;
transmit, over a network associated with the at least one processing device, the at least one updated module interface component to a subordinate user device associated with the subordinate user account identifier, wherein the at least one updated module interface component configures a graphical user interface of the subordinate user device associated with the subordinate user account; and
determine a plurality of module completion statuses for each module of the at least one updated module interface component, wherein the plurality of module completion statuses comprise data associated with a plurality of interactions by the subordinate user account with the at least one updated module interface component.

11. The computer program product of claim 10, wherein the processing device is further configured to cause the processing device to:
determine, based on tracking the plurality of subordinate user account interactions, whether an activity-based module of the plurality of modules is completed by the subordinate user,
wherein, in the instance where the subordinate user account has completed the activity-based module of the plurality of modules, automatically transmit a resource distribution from the supervisor user account to the subordinate user account, the resource distribution comprising a pre-determined distribution determined by the supervisor user account.

12. The computer program product of claim 10, wherein the processing device is further configured to cause the processing device to:
determine, based on tracking the plurality of subordinate user account interactions, whether a transfer-based module of the plurality of modules is completed by the subordinate user,
wherein, in the instance where the subordinate user account has completed a transfer-based module of the plurality of modules, automatically transmit a transfer-based resource distribution from the subordinate user account to a transfer-based account associated with the transfer-based module.

13. The computer program product of claim 10, wherein the processing device is further configured to cause the processing device to:
generate, by the trained module selection engine, a plurality of module set templates, wherein each module set template of the plurality of module set templates comprises a plurality of modules that are selected based on an intended module result.

14. The computer program product of claim 10, wherein the processing device is further configured to cause the processing device to:
receive, from a supervisor user account associated with the supervisor user account identifier, a plurality of pre-selected module set templates;
apply the trained module selection engine to the plurality of pre-selected module set templates; and
generate, by the trained module selection engine, a plurality of module set templates.

15. The computer program product of claim 10, wherein the processing device is further configured to cause the processing device to:
generate, by the trained module selection engine, a plurality of timestamps for the transmission of the approved at least one module interface component to the user device associated with the subordinate user account.

16. A computer-implemented method for generating and training a module selection engine for distribution allocation, the computer-implemented method comprising:
receiving, by the at least one processing device, a subordinate user account identifier associated with a subordinate user account;
determining, by the at least one processing device, a supervisor user account identifier associated with the subordinate user account identifier;
training a module selection engine with a set of supervisor-account-specific acceptable modules associated with the supervisor account identifier, the set of supervisor-account-specific acceptable modules comprising a plurality of modules previously indicated as acceptable by the supervisor user account for the subordinate user;
applying the trained module selection engine to the subordinate user account identifier, wherein the module selection engine determines a plurality of modules to present to the subordinate user based on the subordinate user account identifier;
generating, by the trained module selection engine, a plurality of module interface components for the subordinate user;
transmitting, over a network associated with the at least one processing device, the plurality of module interface components to a supervisor user device associated with the supervisor user account identifier;
receiving, in response to the transmission of the plurality of module interface components to the supervisor user device, an approval of at least one module interface component for the subordinate user;
retraining the trained module selection engine using the approved at least one module interface component;
selecting, by the trained module selection engine and in response to the retraining of the trained module selection engine, at least one updated module interface component;

transmitting, over a network associated with the at least one processing device at least one updated module interface component to a subordinate user device associated with the subordinate user account identifier, wherein the at least one updated module interface component configures a graphical user interface of the subordinate user device associated with the subordinate user account;
and
determine a plurality of module completion statuses for each module of the at least one updated module interface component, wherein the plurality of module completion statuses comprise data associated with a plurality of interactions by the subordinate user account with the at least one updated module interface component.

17. The computer-implemented method of claim 16, the computer-implemented method further comprising:
determining, based on tracking the plurality of subordinate user account interactions, whether an activity-based module of the plurality of modules is completed by the subordinate user,
wherein, in the instance where the subordinate user account has completed the activity-based module of the plurality of modules, automatically transmit a resource distribution from the supervisor user account to the subordinate user account, the resource distribution comprising a pre-determined distribution determined by the supervisor user account.

18. The computer-implemented method of claim 16, the computer-implemented method further comprising:
determining, based on tracking the plurality of subordinate user account interactions, whether a transfer-based module of the plurality of modules is completed by the subordinate user,
wherein, in the instance where the subordinate user account has completed a transfer-based module of the plurality of modules, automatically transmit a transfer-based resource distribution from the subordinate user account to a transfer-based account associated with the transfer-based module.

19. The computer-implemented method of claim 16, the computer-implemented method further comprising:
generating, by the trained module selection engine, a plurality of module set templates, wherein each module set template of the plurality of module set templates comprises a plurality of modules that are selected based on an intended module result.

20. The computer-implemented method of claim 16, the computer-implemented method further comprising:
receiving from a supervisor user account associated with the supervisor user account identifier, a plurality of pre-selected module set templates;
applying the module selection engine to the plurality of pre-selected module set templates; and
generating, by the module selection engine, a plurality of module set templates.

\* \* \* \* \*